US012421924B2

(12) United States Patent
Gangler et al.

(10) Patent No.: US 12,421,924 B2
(45) Date of Patent: Sep. 23, 2025

(54) FUEL SUPPLY ASSEMBLY WITH IN-TANK RESERVOIR

(71) Applicant: Walbro LLC, Cass City, MI (US)

(72) Inventors: Bryan K. Gangler, Unionville, MI (US); Jacob R. Mikulak, Vassar, MI (US); Bradley J. Roche, Millington, MI (US); David L. Speirs, Cass City, MI (US)

(73) Assignee: WALBRO LLC, Cass City, MI (US)

( * ) Notice: Subject to any disclaimer, the term of this patent is extended or adjusted under 35 U.S.C. 154(b) by 242 days.

(21) Appl. No.: 18/027,663

(22) PCT Filed: Sep. 29, 2021

(86) PCT No.: PCT/US2021/052551
§ 371 (c)(1),
(2) Date: Mar. 22, 2023

(87) PCT Pub. No.: WO2022/072426
PCT Pub. Date: Apr. 7, 2022

(65) Prior Publication Data

US 2023/0407827 A1 Dec. 21, 2023

Related U.S. Application Data

(60) Provisional application No. 63/085,473, filed on Sep. 30, 2020.

(51) Int. Cl.
*F02M 37/10* (2006.01)
*F02M 37/00* (2006.01)
(Continued)

(52) U.S. Cl.
CPC ........ *F02M 37/10* (2013.01); *F02M 37/0052* (2013.01); *F02M 37/025* (2013.01);
(Continued)

(58) Field of Classification Search
CPC ........... F02M 37/0029; F02M 37/0052; F02M 37/025; F02M 37/106; F02M 37/12; F02M 37/18
(Continued)

(56) References Cited

U.S. PATENT DOCUMENTS 5,427,074 A 6/1995 Tuckey
2005/0286103 A1* 12/2005 Yu ........................ F02M 37/106 123/509

(Continued)

FOREIGN PATENT DOCUMENTS

JP 2005076458 A 3/2005
JP 2007321584 A 12/2007

OTHER PUBLICATIONS

International Preliminary Report on Patentability for PCT/US2021/052551 dated Apr. 13, 2023, 10 pages.

(Continued)

*Primary Examiner* — Erick R Solis
(74) *Attorney, Agent, or Firm* — DAY PITNEY LLP; George N. Chaclas; Christopher J. Head

(57) ABSTRACT

A fuel supply assembly includes a reservoir, primary and secondary fuel pumps and a pressure regulator. The secondary fuel pump has first and second inlets, and an outlet. The first inlet receives at least some fuel discharged from a pressure regulator outlet, a nozzle communicated with the first inlet so that a flow of fuel through the nozzle creates a drop in pressure in the area of the second fuel inlet to draw fuel from the supply of fuel through the second inlet and the fuel drawn in through the second fuel inlet is combined with the flow of fuel from the nozzle and the combined fuel flows are discharged from the secondary fuel pump outlet and into the reservoir. The primary fuel pump may be located outside of an interior of the reservoir and the secondary fuel pump (Continued)

may be connected to the reservoir by rigid or flexible conduits.

14 Claims, 11 Drawing Sheets

(51) Int. Cl.
*F02M 37/02* (2006.01)
*F02M 37/12* (2006.01)
*F02M 37/18* (2006.01)
*F02M 37/44* (2019.01)

(52) U.S. Cl.
CPC .......... *F02M 37/106* (2013.01); *F02M 37/12* (2013.01); *F02M 37/18* (2013.01); *F02M 37/44* (2019.01)

(58) Field of Classification Search
USPC .......................................... 123/506, 511, 514
See application file for complete search history.

(56) References Cited

U.S. PATENT DOCUMENTS

| | | | | |
|---|---|---|---|---|
| 2007/0144495 | A1* | 6/2007 | Teets ...................... | F02M 37/04 123/509 |
| 2007/0266762 | A1 | 11/2007 | Rumpf | |
| 2011/0000468 | A1* | 1/2011 | Malec .................. | F02M 37/025 123/509 |
| 2012/0247431 | A1 | 10/2012 | Powell et al. | |
| 2019/0170097 | A1 | 6/2019 | Hayashi | |
| 2019/0242341 | A1* | 8/2019 | Anderson .............. | F02M 37/10 |
| 2020/0070648 | A1* | 3/2020 | Moestam ............. | F02M 37/025 |

OTHER PUBLICATIONS

Written Opinion & International Search Report for PCT/US2021/052551 dated Jan. 10, 2022, 14 pages.

* cited by examiner

FUEL SUPPLY ASSEMBLY WITH IN-TANK RESERVOIR

REFERENCE TO RELATED APPLICATIONS

This application claims the benefit of U.S. Provisional Application Ser. No. 63/085,473 filed on Sep. 30, 2020 the entire content of which is incorporated herein by reference in its entirety.

TECHNICAL FIELD

The present disclosure relates generally to a fuel supply assembly that includes an in-tank reservoir.

BACKGROUND

Fuel systems may include a fuel tank in which a fuel pump is located to pump fuel from an interior of the tank to an engine, to support operation of the engine. Fuel vapor can be generated in fuel flowing in or otherwise in the fuel tank and fuel system. And the fuel vapor when within fuel provided to the engine, reduces the volume or flow rate of liquid fuel to the engine. Further, some fuel tanks have odd shapes and fuel movement within the fuel tank, due to acceleration or other forces, can move fuel away from the primary fuel pump.

SUMMARY

In at least some implementations, a fuel supply assembly includes a reservoir having an interior and an inlet that communicates with the reservoir interior, a primary fuel pump, a pressure regulator and a secondary fuel pump. The primary fuel pump has an inlet in communication with the reservoir interior, and an outlet through which fuel is discharged under pressure. The pressure regulator has an inlet that receives fuel previously discharged from the primary fuel pump outlet, an outlet through which fuel flows and a pressure regulating valve that controls fuel flow from the pressure regulator inlet to the pressure regulator outlet. The secondary fuel pump has a body that defines a first inlet, a second inlet and an outlet. The first inlet receives at least some of the fuel discharged from the pressure regulator outlet, a nozzle communicated with the first inlet so that fuel that flows out of the nozzle flows into the body via the first inlet, the second inlet is in communication with a supply of fuel, and the outlet is in communication with the reservoir interior. The flow of fuel through the nozzle creates a drop in pressure in the area of the second fuel inlet to draw fuel from the supply of fuel through the second fuel inlet and the fuel drawn in through the second fuel inlet is combined with the flow of fuel from the nozzle and the combined fuel flows are discharged from the secondary fuel pump outlet and into the reservoir.

In at least some implementations, a return fuel line is provided and the return fuel line is coupled to the pressure regulator inlet.

In at least some implementations, the primary fuel pump is carried by a mount body, a bracket extends between the mount body and the reservoir, and the reservoir is located spaced from the mount body. The mount body may include a mounting flange adapted to be coupled to an upper wall of a fuel tank, and the reservoir may include a bottom wall adapted to engage a bottom wall of the fuel tank.

In at least some implementations, the reservoir includes a baffle defining an inlet chamber into which fuel is received from the secondary pump outlet.

In at least some implementations, the reservoir is constructed so that a lower wall of the reservoir is adapted to be received against a lower wall of a fuel tank, and the lower wall of the reservoir is longer than the height of the reservoir, where height is the dimension extending away from the lower wall of the reservoir.

In at least some implementations, the reservoir includes a channel that directs fuel outwardly against an inner surface of the reservoir. The channel may have multiple levels that define a spiral flow path.

In at least some implementations, the reservoir includes a body that defines an inner surface that is tapered, wherein the inner surface has a smaller cross sectional area nearer to a bottom of the reservoir than an upper end of the reservoir.

In at least some implementations, an inlet valve is provided in the inlet of the reservoir, and the inlet valve is shaped to direct fuel along an inner surface of the reservoir.

In at least some implementations, the secondary pump is coupled to a filter and the filter and secondary pump are located remotely from the reservoir. The secondary fuel pump may be coupled to the reservoir by one or more rigid conduits that maintain the secondary fuel pump at a distance from the reservoir that does not vary by more than ten percent in use of the assembly. The secondary fuel pump may be coupled to the reservoir by one or more conduits that are flexible to permit the secondary fuel pump to move relative to the reservoir by six or more inches under the force of fuel and acceleration forces on the secondary fuel pump in use of the assembly.

In at least some implementations, the primary fuel pump is located outside of the reservoir interior. In at least some implementations, the primary pump is not carried by the reservoir.

In at least some implementations, a fuel supply assembly includes a reservoir having an interior and an inlet that communicates with the reservoir interior, a primary fuel pump, a secondary fuel pump, and a fuel filter. The primary fuel pump is located outside of the reservoir interior and has an inlet in communication with the reservoir interior, and the primary fuel pump has an outlet through which fuel is discharged under pressure. The secondary fuel pump has a body that defines a first inlet, a second inlet and an outlet, wherein the first inlet receives at least some of the fuel discharged from the primary fuel pump outlet, a nozzle communicated with the first inlet so that fuel that flows out of the nozzle flows into the body via the first inlet, the second inlet is in communication with a supply of fuel, and the outlet is in communication with the reservoir interior. The flow of fuel through the nozzle creates a drop in pressure in the area of the second fuel inlet to draw fuel from the supply of fuel through the second fuel inlet and the fuel drawn in through the second fuel inlet is combined with the flow of fuel from the nozzle and the combined fuel flows are discharged from the secondary fuel pump outlet and into the reservoir. The fuel filter is coupled to the body of the secondary fuel pump and arranged to filter fuel that flows into the second fuel inlet. The secondary fuel pump and fuel filter are located spaced from the reservoir and are coupled to the reservoir by one or more conduits.

In at least some implementations, the primary fuel pump is carried by a mount body, a bracket extends between the mount body and the reservoir, and the reservoir is located spaced from the mount body.

In at least some implementations, the primary fuel pump is carried by a mount body that is adapted to be connected to a fuel tank, a conduit extends between the mount body and the reservoir, and the reservoir is located spaced from the mount body.

In at least some implementations, the reservoir includes a channel that directs fuel outwardly against an inner surface of the reservoir.

In at least some implementations, the reservoir includes a body that defines an inner surface and at least a portion of the inner surface is tapered so that the at least a portion of the inner surface has a smaller cross sectional area nearer to a bottom of the reservoir than an upper end of the reservoir, wherein the bottom and upper end of the reservoir are determined with reference to an installed position of the reservoir.

In at least some implementations, the secondary fuel pump is coupled to the reservoir by one or more conduits that are rigid enough to prevent the secondary fuel pump from moving relative to the reservoir a distance greater than a largest dimension of the body of the secondary fuel pump under the force of fuel in a fuel tank acting on the body of the secondary fuel pump.

In at least some implementations, the secondary fuel pump is coupled to the reservoir by one or more conduits that are flexible enough to permit the secondary fuel pump to move relative to the reservoir a distance greater than a largest dimension of the body of the secondary fuel pump under the force of fuel in a fuel tank acting on the body of the secondary fuel pump.

BRIEF DESCRIPTION OF THE DRAWINGS

The following detailed description of certain embodiments and best mode will be set forth with reference to the accompanying drawings, in which.

DETAILED DESCRIPTION

Figure 1:
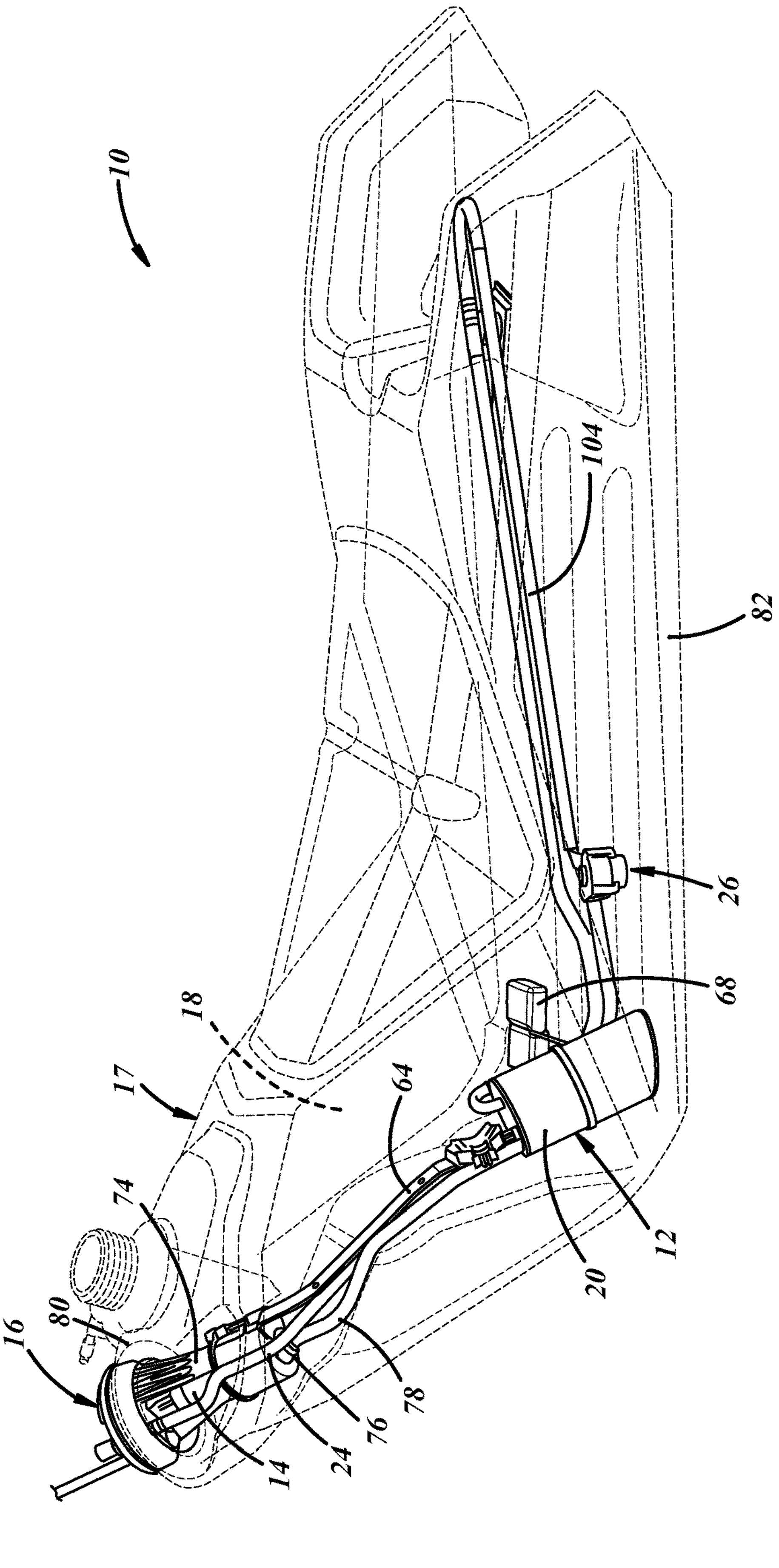
FIG. 1 is a perspective view of components of a fuel supply assembly shown with a transparent fuel tank so internal components can be seen.

Referring in more detail to the drawings, FIG. 1 illustrates a fuel supply assembly 10 having a reservoir 12 in which a supply of fuel is contained and a primary fuel pump 14 to pump fuel from the reservoir 12 for use by an engine. The fuel pump 14 may be carried by a mount 16 that is connected to a fuel tank 17 having an interior 18 in which a supply of fuel is maintained. The reservoir 12 may be received within the fuel tank interior 18 and include or be defined by a main body 20 that defines an internal volume 22 (FIG. 4) in which fluid is retained. The fuel pump 14 takes in fuel from the internal volume 22, increases the pressure of the fuel and discharges fuel under pressure for delivery to the engine.

To ensure that the engine has sufficient fuel to support its operation, including increased fuel demand to support engine acceleration, more fuel is sent to the engine than is needed by the engine. Excess fuel may be returned to the fuel tank interior through a return line 24. To maintain a desired fuel pressure in the fuel supply system, a fuel pressure regulator 26 may be provided. In the example shown, the fuel pressure regulator 26 is received in the fuel tank interior 18, and fuel from the return line 24 is provided to an inlet 28 of the regulator 26. Fuel beyond a set or desired pressure is discharged from the regulator 26 through an outlet 30 that is connected to an inlet 32 of a secondary fuel pump 34, which may be a fluid driven jet pump. To improve movement of fuel from an area of the fuel tank interior 18 spaced from the reservoir 12, the jet pump 34 may be located in a remote area of the fuel tank interior 18. The jet pump 34 moves fuel from the area of the tank in which it is located through an outlet 36 to the interior of the reservoir 12, as will be described in greater detail below. In this way, fuel is moved from the fuel tank 17 into the reservoir 12 and then from the reservoir 12 to the primary fuel pump 14 and to the engine.

Figure 4:
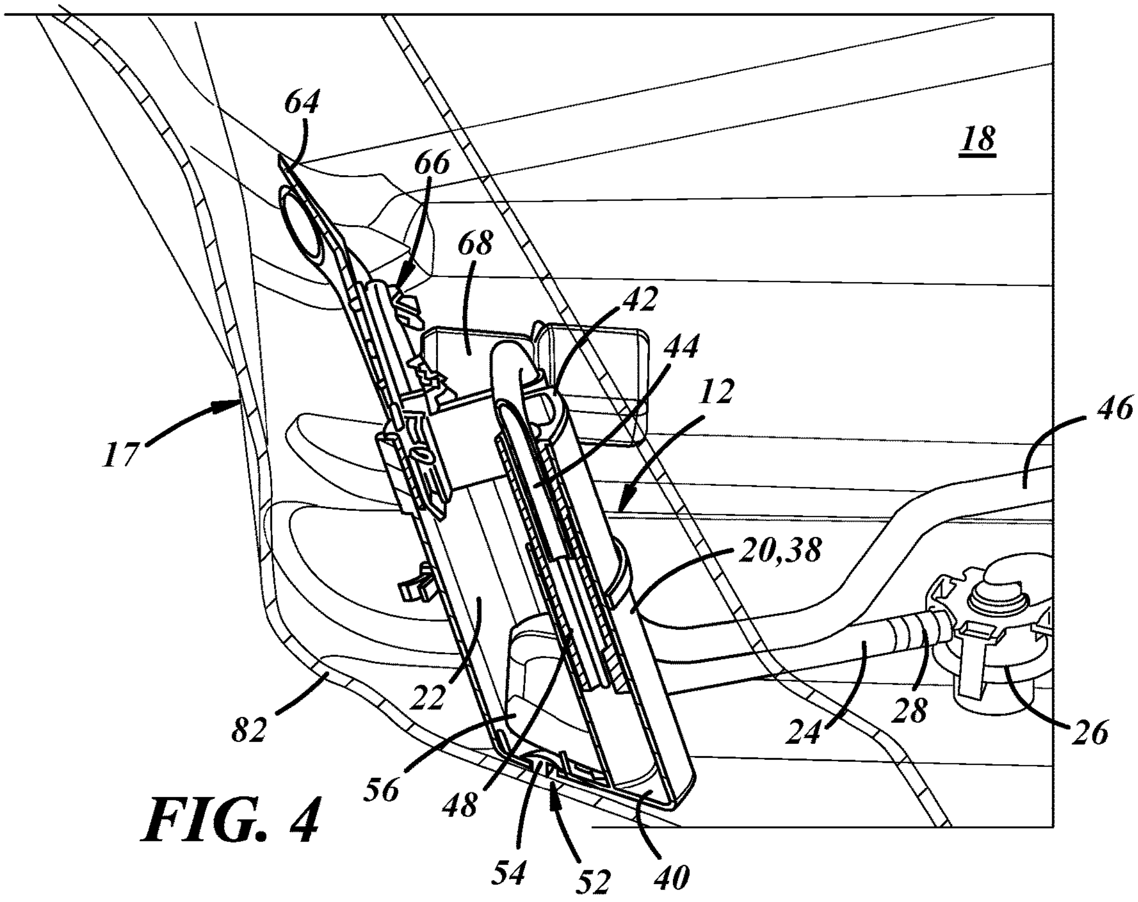
FIG. 4 is a fragmentary sectional view of the fuel supply assembly showing an interior of a reservoir.

The reservoir 12 may be of any desired shape and provide any desired size internal volume 22. As shown in FIG. 4, the main body 20 may have a generally cylindrical sidewall 38 that is mostly closed at one end by a bottom wall 40 and open at its other end 42 so that components (e.g. a fuel filter and structures to guide fuel flow) can be received at least partially within the internal volume 22. In at least some implementations, the reservoir 12 includes a first inlet 44 (FIG. 5) through which fuel from the jet pump is discharged into the internal volume 22, such as via a jet pump outlet tube 46. To control fuel flow within the reservoir 12, the outlet tube 46 may be received at least partially within a passage 48 (FIG. 4) or cavity that may be integrally formed in the reservoir 12 and which may define or communicate with the first inlet 44. The outlet tube 46 and/or the passage may include retention features to hold the outlet tube in position relative to the reservoir 12. In the example shown, the reservoir includes tabs 50 extending inwardly into the passage 48 and adapted to frictionally engage the exterior of the outlet tube 46. Spaces exist between the tabs 50 and gasses like air and fuel vapor may escape from the reservoir 12 through these spaces, as well as through the generally open upper end 42 of the reservoir 12. The passage 48 may direct this inlet fuel flow toward the bottom wall 40 of the reservoir 12.

Figure 5:
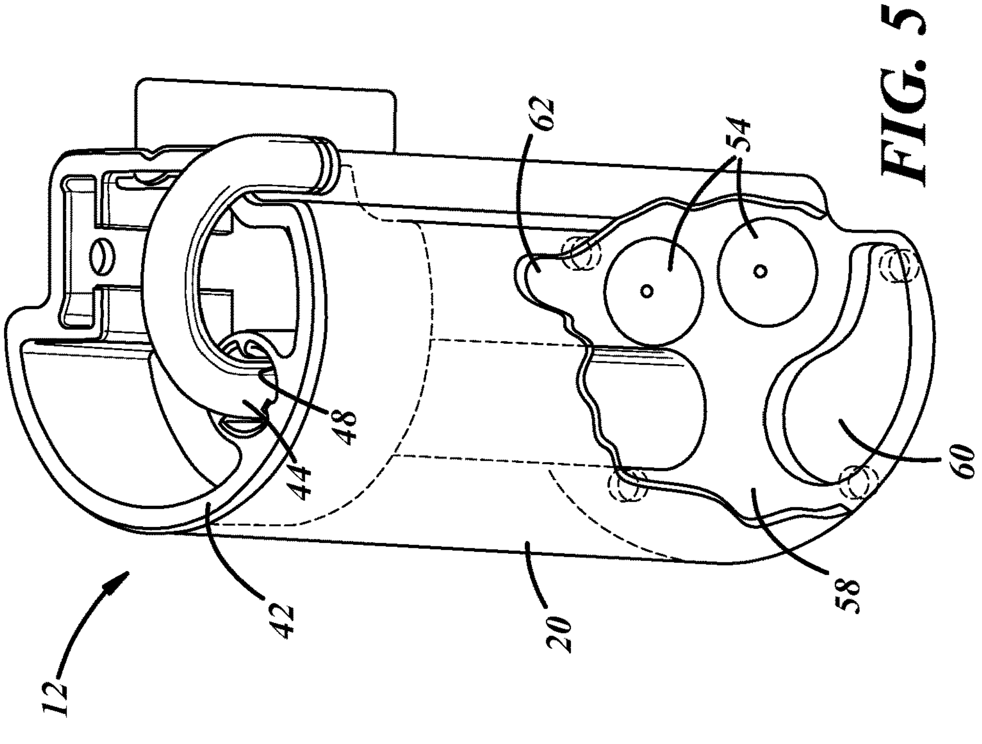
FIG. 5 is a perspective view of the reservoir.

One or more second inlets 52 (FIG. 2) in the reservoir 12 may be provided to permit liquid fuel to enter the internal volume 22 when the level of fuel in the fuel tank interior 18 is greater than the height or level of the second inlet 52 and of the fuel in the internal volume 22. A check valve 54 may be provided at the second inlet 52 to permit fuel flow from the tank interior 18 into the internal volume 22 but to prevent fuel in the internal volume 22 from flowing to the fuel tank interior 18 through the second inlet 52. This prevents the reservoir 12 from draining through the second inlet 52 when the level of the fuel in the tank interior 18 is lower than that in the internal volume 22. FIG. 5 shows two second inlets 52 and two check valves carried by the bottom wall 40 of the reservoir body 20.

Figure 6:
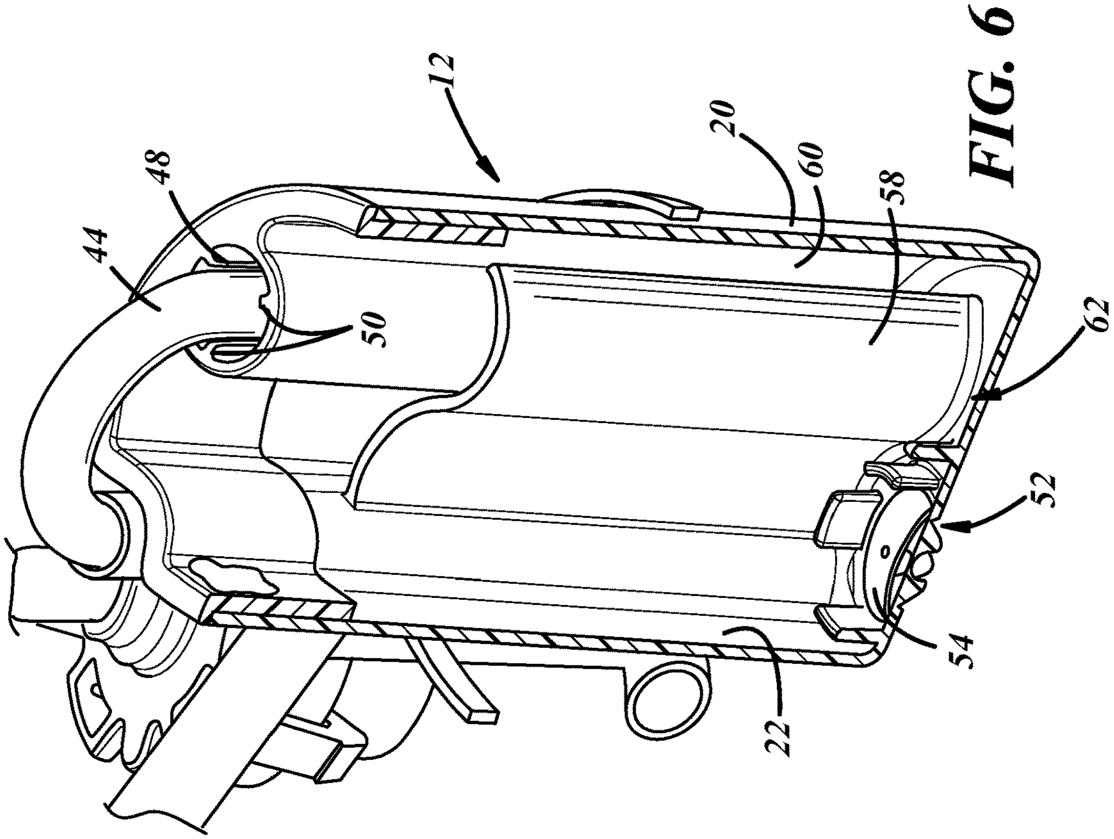
FIG. 6 is a sectional view of the reservoir with a fuel filter removed.

Above the second inlets 52, a fuel filter 56 may be provided to remove contaminants from the liquid fuel prior to the fuel being routed to the primary fuel pump 14 for delivery to the engine. To control the flow of fuel within the reservoir from the inlet 44, the reservoir may include an interior baffle 58 (FIG. 6) that defines an inlet chamber 60 communicated with the first inlet 44, and an outlet chamber 62 communicated with the primary fuel pump 14. The flow of fuel into the inlet chamber 60 may generate fuel vapor, and the baffle 58 may provide an area in which fuel vapor may separate from the liquid fuel and exit the reservoir internal volume 22 to avoid or reduce vapor flowing to the outlet chamber 62 and primary fuel pump 14. The fuel filter 56 may be replaced with a metal or plastic screen, other filter or strainer, or eliminated, as desired. A filter may be provided at the end of the passage 48.

The reservoir 12 may be formed from any desired material suitable for use with the fuel being pumped. The reservoir 12 may be coupled to the fuel tank 17 and/or the reservoir 12 may be coupled to the mount 16 by which the primary fuel pump 14 is mounted to the fuel tank 17. In the example shown, a bracket 64 connects to the reservoir 12 and the mount 16 to hold the reservoir 12 in place within the fuel tank interior 18. A fuel level sensor 66 may be carried by the reservoir body 20 or the bracket 64 as desired. The fuel level sensor 66 may include a buoyant float 68 carried by a pivoting arm 70 (FIG. 3) coupled to a sensor that is responsive to movement of the arm 70, as is known in the art.

Figure 3:
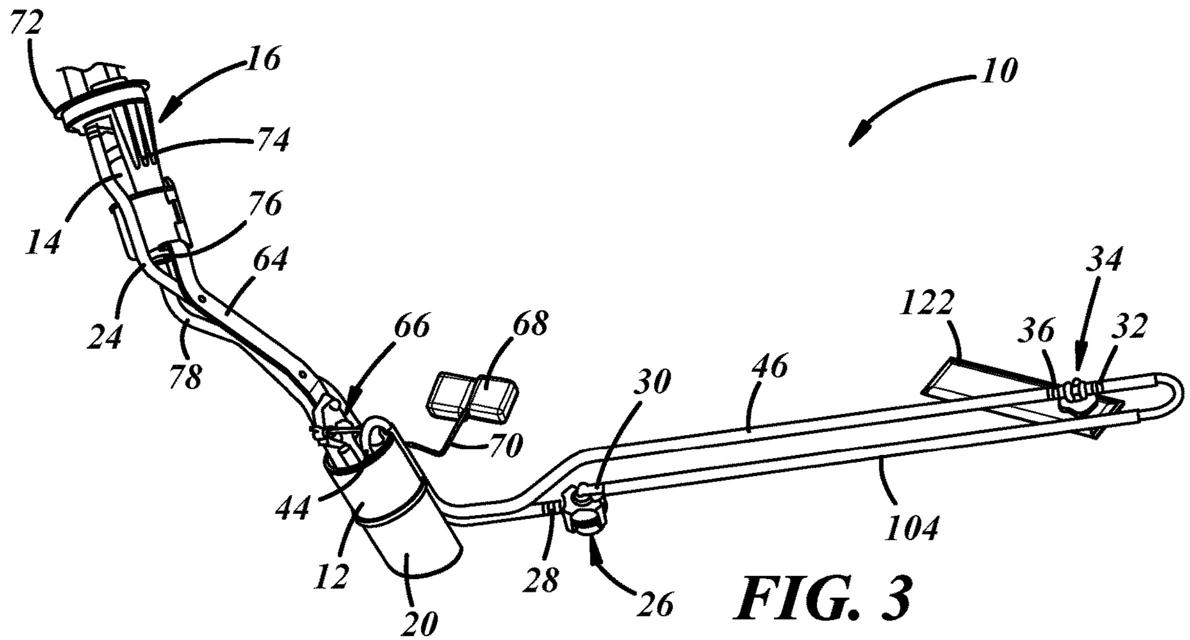
FIG. 3 is a perspective view of the fuel supply assembly components without the fuel tank.

To retain the primary fuel pump 14 within the fuel tank 17, the mount 16 may include a mounting flange 72 adapted to be sealed to a wall of the fuel tank 17 over an opening through which at least some of the components of the assembly 10 may be inserted into the fuel tank 17. The mounting flange 72 is coupled to a mount body 74 to which the primary fuel pump 14 is connected. As shown in FIGS. 1 and 3, an inlet 76 of the primary fuel pump 14 may be accessible through the mount body 74 to facilitate coupling an inlet tube 78 to the primary fuel pump 14, the other end of the inlet tube 78 being coupled to the reservoir 12 or otherwise in communication with fuel within the reservoir interior 22. An outlet of the primary fuel pump 14 may extend through the mounting flange 72, or be communicated with a passage through the mounting flange 72, to deliver fuel under pressure to the engine. Similarly, the return line 24 may extend through the mounting flange 72, or be communicated with a passage through the flange, to deliver fuel into the fuel tank interior 18, as described above.

The primary fuel pump 14 may include an electric motor and a pumping element driven by the motor. The pumping element creates a pressure drop at the inlet 76 of the fuel pump 14 to draw fuel into the inlet 76, and increases the pressure of fuel taken into the pumping element so that fuel is discharged from the fuel pump 14 under pressure. The pumping element may be of a positive displacement type, like a gerotor or screw pump, or a centripetal pump like a turbine type pump. The primary fuel pump 14 may be located near the upper wall 80 of the fuel tank 17, and the reservoir 12 may be located near the lower or bottom wall 82 of the fuel tank 17. In at least some implementations, at least the portion of the upper wall 80 to which the mounting flange 72 is coupled may be spaced significantly from the bottom wall 82 of the fuel tank 17. This spaces the primary fuel pump 14 a significant distance from the reservoir 12. Hence, in such implementations, the primary fuel pump 14 is designed to be capable of creating sufficient lift to move fuel from the reservoir 12 into the primary fuel pump 14. In some implementations, another fuel pump may be provided to pump fuel from the reservoir 12 to the primary fuel pump inlet 76. This other fuel pump may be located in the reservoir interior 22 or otherwise between the interior 22 and the primary fuel pump 14.

Fuel that is returned to the fuel tank 17 through the return line 24 is routed from the mounting flange 72 to the inlet 32 of the pressure regulator 26. Alternatively, the regulator 26 may be carried by the mounting flange 72 or other portion of the pump mount 16, and the regulator inlet 32 may be directly coupled to the return fuel passage through the mounting flange 72. As another alternative, the pressure regulator 26 could be carried by or otherwise coupled to the reservoir 12, or the regulator 26 could be coupled to the secondary fuel pump 34.

Figure 7:
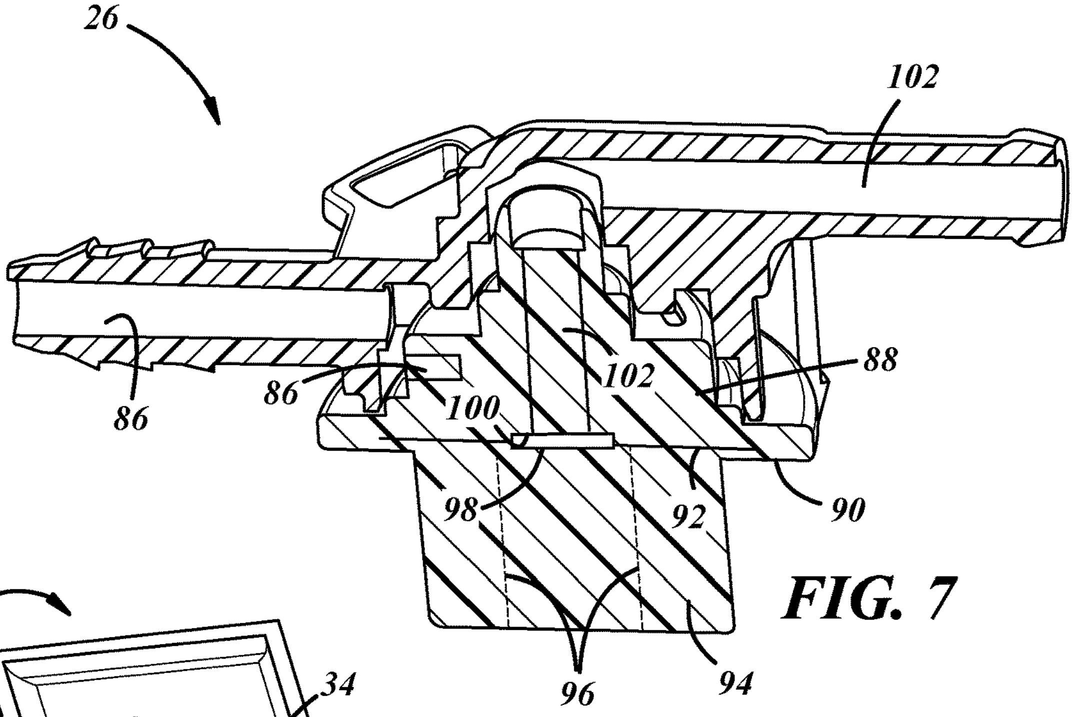
FIG. 7 is a sectional and diagrammatic view of a fuel pressure regulator.

The regulator 26 is shown diagrammatically in FIG. 7 and includes an inlet 86 through which fuel enters a regulating chamber 88 defined at least in part by a housing 90 and a diaphragm 92 which defines a dry chamber 94 on the opposite side. A spring 96 or other biasing member may be received in the dry chamber 94 to oppose the force of the fuel acting on the diaphragm 92 from within the regulating chamber 88. The diaphragm 92, or a valve 98 coupled to the diaphragm 92, may engage a valve seat 100 that leads to an outlet 102 of the regulator 26 to close the outlet 102. When acted upon by sufficient fuel pressure, the diaphragm 92 may be displaced against the spring force and thereby open the valve seat 100 and regulator outlet 102 to permit fuel flow out of the regulator outlet 102.

Figure 2:
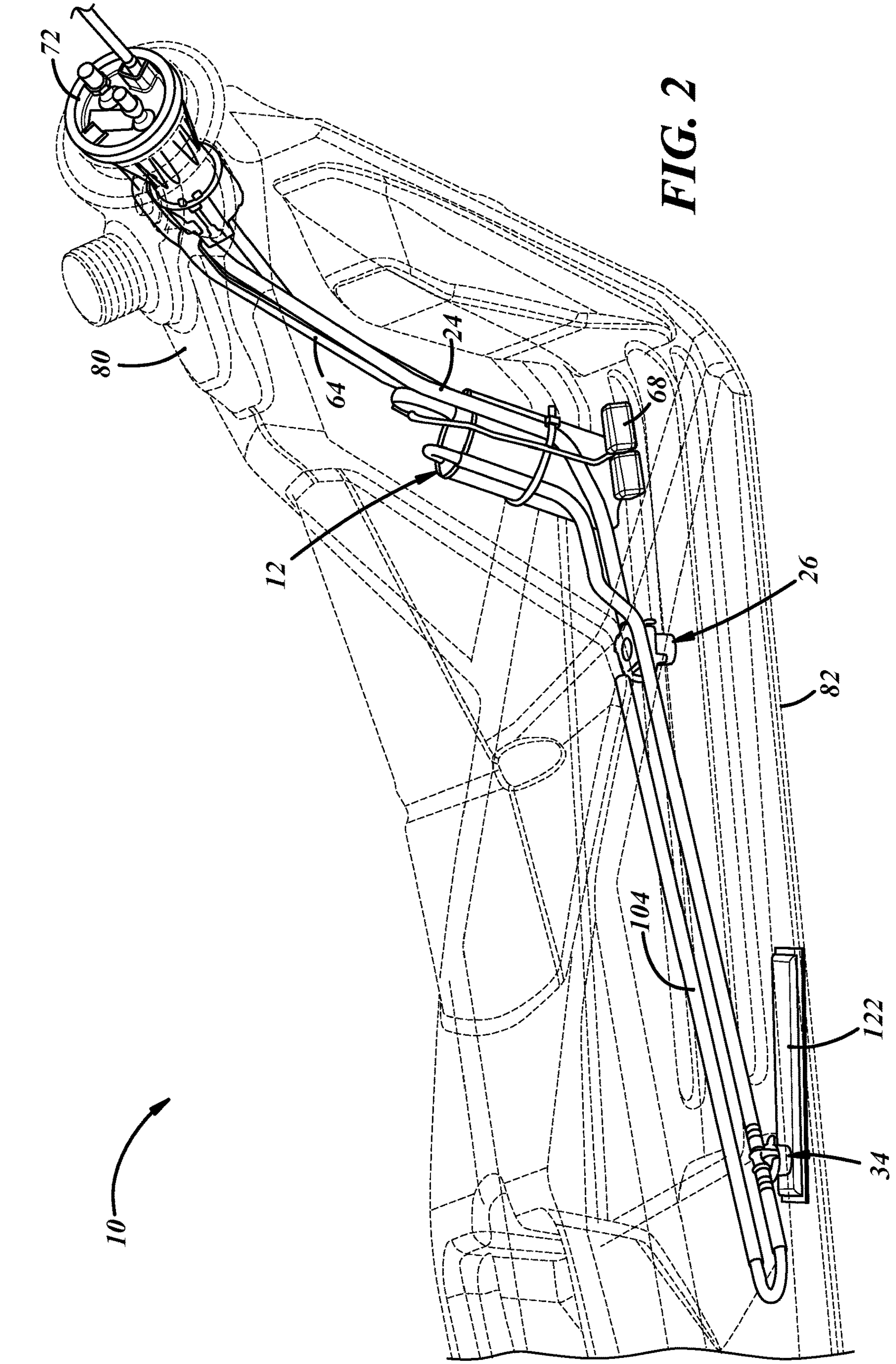
FIG. 2 is an enlarged perspective view of a portion of the fuel supply assembly of FIG. 1.

Fuel discharged from the regulator outlet 102 is delivered to the secondary pump 34, such as by a secondary pump inlet tube 104 (FIGS. 1-3). In at least some implementations, such as that shown in FIGS. 8-10, the secondary pump 34 includes a main body 106 having inlet 32 that is coupled to the inlet tube 104, and that leads to a nozzle 105, jet or restriction that increases the velocity of fuel flowing therethrough. The nozzle 105 discharges fuel into a larger area 108, which may be defined by part of a venturi or tapered portion of an outlet passage 110 of the main body 106 that leads to the outlet 36. The increase in velocity of fuel discharged from the nozzle 105 causes a decrease in pressure in the area 108 downstream of the nozzle 105 which is communicated with a pick-up inlet 112 (FIG. 9). The pressure drop causes fuel to flow through the pick-up inlet 112 whereupon that fuel joins the fuel discharged from the nozzle 105 and the combined fuel flow may be discharged into the outlet 36 and the connected outlet tube 46 that leads to the reservoir 12. While the inlet 32, outlet 36, pick-up inlet 112 and nozzle 105 are shown as being integrally formed in the same piece of material, the nozzle and/or outlet may be formed in separate pieces, as desired. As noted earlier, the secondary pump 34 may be located remotely from the reservoir 12, that is spaced from and located in a different portion of the fuel tank interior 18 than the reservoir 12. The secondary pump 34 may move fuel to the reservoir 12 from an area of the tank interior 19 that is spaced apart from the reservoir 12. Fuel may move away from the reservoir 12 when, for example, a vehicle including the fuel tank is accelerating, decelerating, ascending, descending or navigating a turn, especially when a low fuel level exists in the fuel tank interior 18.

Figure 8:
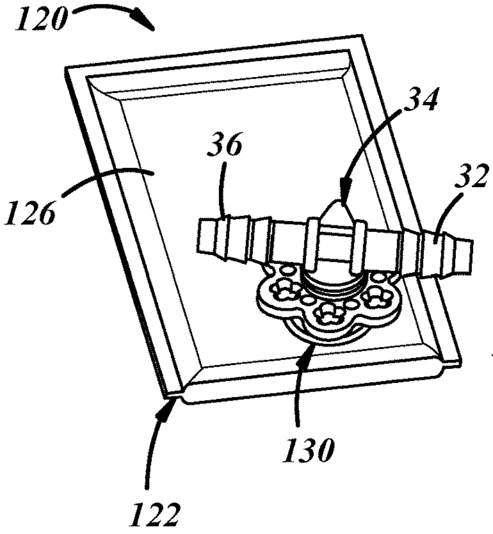
FIG. 8 is a perspective view of a fuel filter and jet pump assembly.
Figure 9:
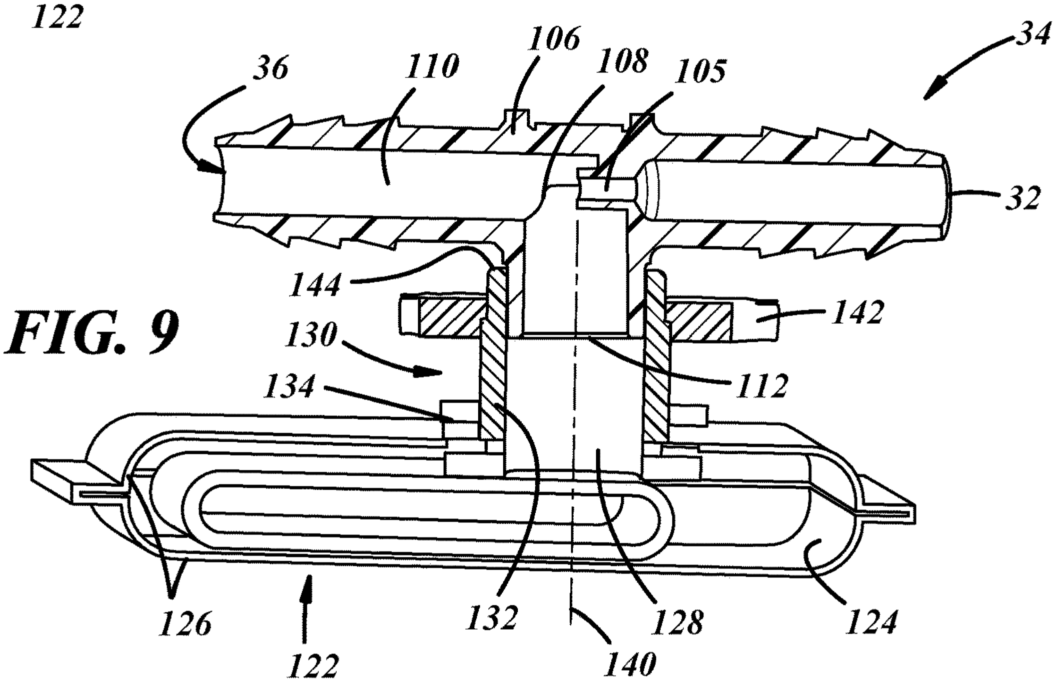
FIG. 9 is a sectional view of the assembly of FIG. 8.
Figure 10:
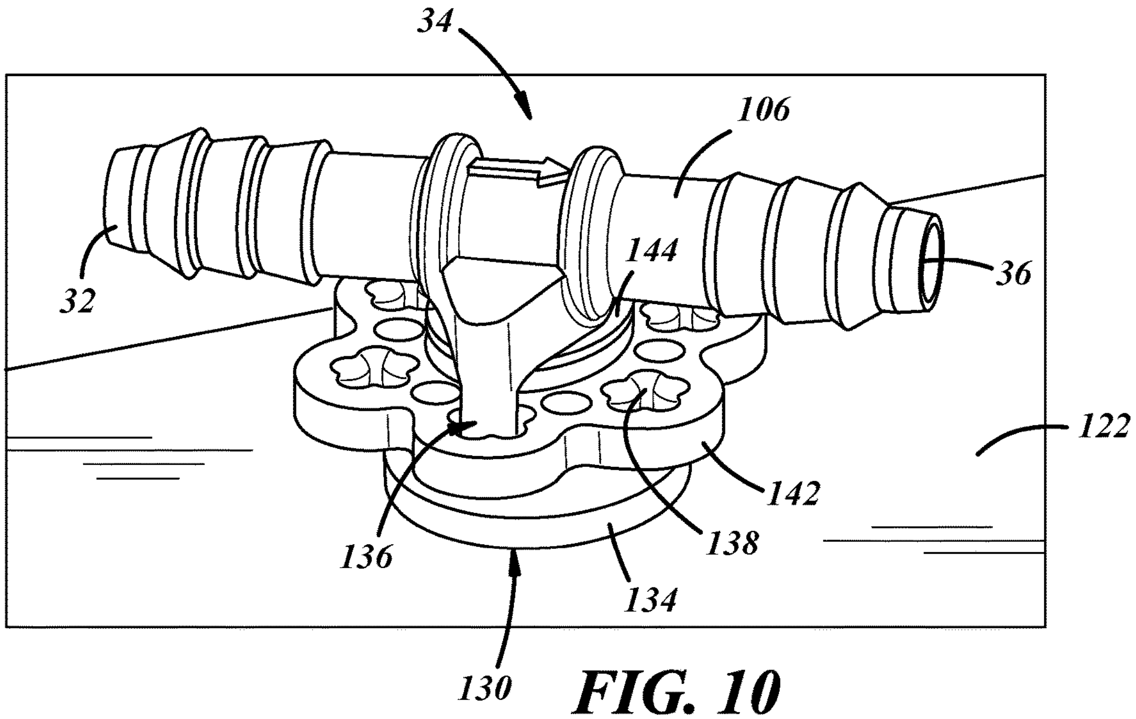
FIG. 10 is a perspective view of a portion of the fuel filter and jet pump assembly.

The secondary pump 34 may be part of a filter assembly 120, as shown in more detail in FIGS. 8-10, that includes a jet pump body 106 coupled to a filter 122. The filter 122 may include an interior 124 (FIG. 9) bounded by walls 126 defined by or including filter media of any desired shape, material and construction. Fluid enters the interior 124 by flowing through the filter wall(s) 126, and at least some contaminants are trapped or prevented from entering the interior by the walls 126. The fluid in the filter interior 124 is communicated with the jet pump body 106 via a filter outlet passage 128 through which fluid flows to the jet pump body 106.

In the implementation shown, the jet pump body 106 shown in FIG. 3 is connected to the filter 122 via a coupler 130. The coupler 130 includes a tubular body 132 sealed about its periphery to one or more walls 126 of the filter 122, such as by having a radially outwardly extending flange 134 at a base of the tubular body 132 glued, welded or otherwise bonded to a surface of a filter wall 126. The tubular body 132 is received in or over the portion of the jet pump body 106 that defines the pick-up inlet 112.

The jet pump body 106 may be secured to the coupler 130 in any desired manner, such as by being press-fit into or over the tubular body 132, screwed into the tubular body 132 via threads in one or both bodies (e.g. mating or self-tapping threads), adhered, bonded, welded, clipped or otherwise secured in position relative to the coupler. Further, the coupler 130 and jet pump body 106 may include cooperating orientation features so that the jet pump body 106 can be oriented and retained in different angular orientations relative to the coupler 130. In at least some implementations, such as is shown in FIG. 10, the orientation features include one or more projections 136 carried by one of the coupler and jet pump body, and one or more voids 138 carried by the other of the coupler and jet pump body.

In the implementation shown, the coupler 130 includes a plurality of voids 138 circumferentially spaced about the periphery of the coupler, outboard of the filter outlet 128 and tubular body 132. The voids 138 are open in the direction of connection of the jet pump body 106 to the coupler 130, in this example, this is parallel to an axis 140 (FIG. 9) of the coupler 130. The voids 138 are provided in a radially outwardly extending portion 142 of the coupler 130, and are axially between the filter 122 and a free end 144 (FIG. 9) of the tubular body 132. The outwardly extending portion 142 may be formed in the same piece of material as the tubular body 132 or the outwardly extending portion may be formed separately from and then connected to the tubular body.

The jet pump body 106 includes a projection, referred to hereafter as a post 136 (labeled in FIGS. 7 and 8), that is adapted to be received in one of the voids 138 of the coupler 130. The post 136 extends outwardly from the jet pump body 106, and is spaced from the portion of the jet pump body 106 that defines the pick-up inlet 122 so that the post 136 is located outboard of the tubular body 132 when the jet pump body 106 is installed on the coupler 130. The post 136 extends axially (e.g. parallel to the axis 90 of the tubular body when the jet pump body 106 is installed on the coupler) and when received in a void 138, prevents rotation of the jet pump body 106 relative to the coupler 130 about the axis 140.

To change the orientation of the jet pump body 106 relative to the coupler 130 and filter 122, the jet pump body 106 is moved axially away from the coupler 130 to remove the post 136 from a void 138, the jet pump body 106 is rotated relative to the coupler 130, and the jet pump body 106 is moved axially back into position relative to the tubular body 132 until the post 136 is received within a different one of the voids 138. Any number of voids 138 may be provided to provide any desired number of orientations of the jet pump body 106 relative to the coupler 130, and the post 136 and voids 138 could be arranged for receipt of the post 136 into a void 138 in a different manner upon installation of the jet pump body to the coupler. Further, the jet pump body 106 could include one or more voids and the coupler 130 could include one or more posts to permit different angular orientations of these components. While a jet pump body might remain in one position for the service life of a given system, the orientation features facilitate use of the assembly in different applications wherein, for example, hoses and other components may require different orientations of the jet pump body.

In operation of the jet pump, fluid is drawn from the filter interior 124, through the filter outlet 128, and into and through the tubular body 132 and pick-up inlet 122 in the manner described above. The driving fluid may be provided from the primary fuel pump 14 (e.g. via a branch passage into which flows a portion of the fuel discharged from the primary fuel pump) or a different fuel pump, or from the pressure regulator 26 as described above. Further, a portion of the fuel discharged from the primary fuel pump 14 may be routed to the pressure regulator 26 directly, that is, without being delivered to and returned from the engine. In this way, the pressure of fuel discharged to the engine can be controlled, and bypass or outlet flow from the regulator 24 can be used to drive the jet pump 34, and this fuel can be routed entirely within tubes and/or passages within the fuel tank interior 18.

Figure 11:
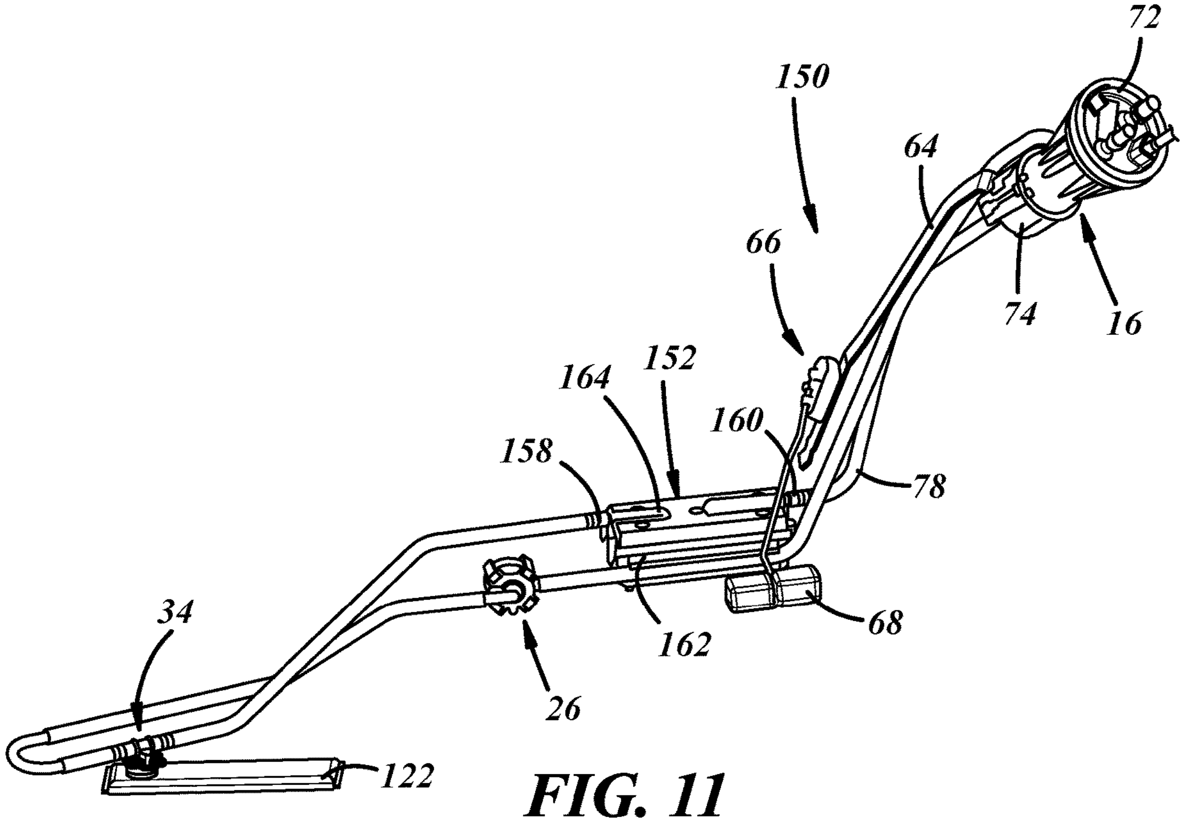
FIG. 11 is a perspective view of a fuel supply assembly including a modified reservoir and without a fuel tank.
Figure 12:
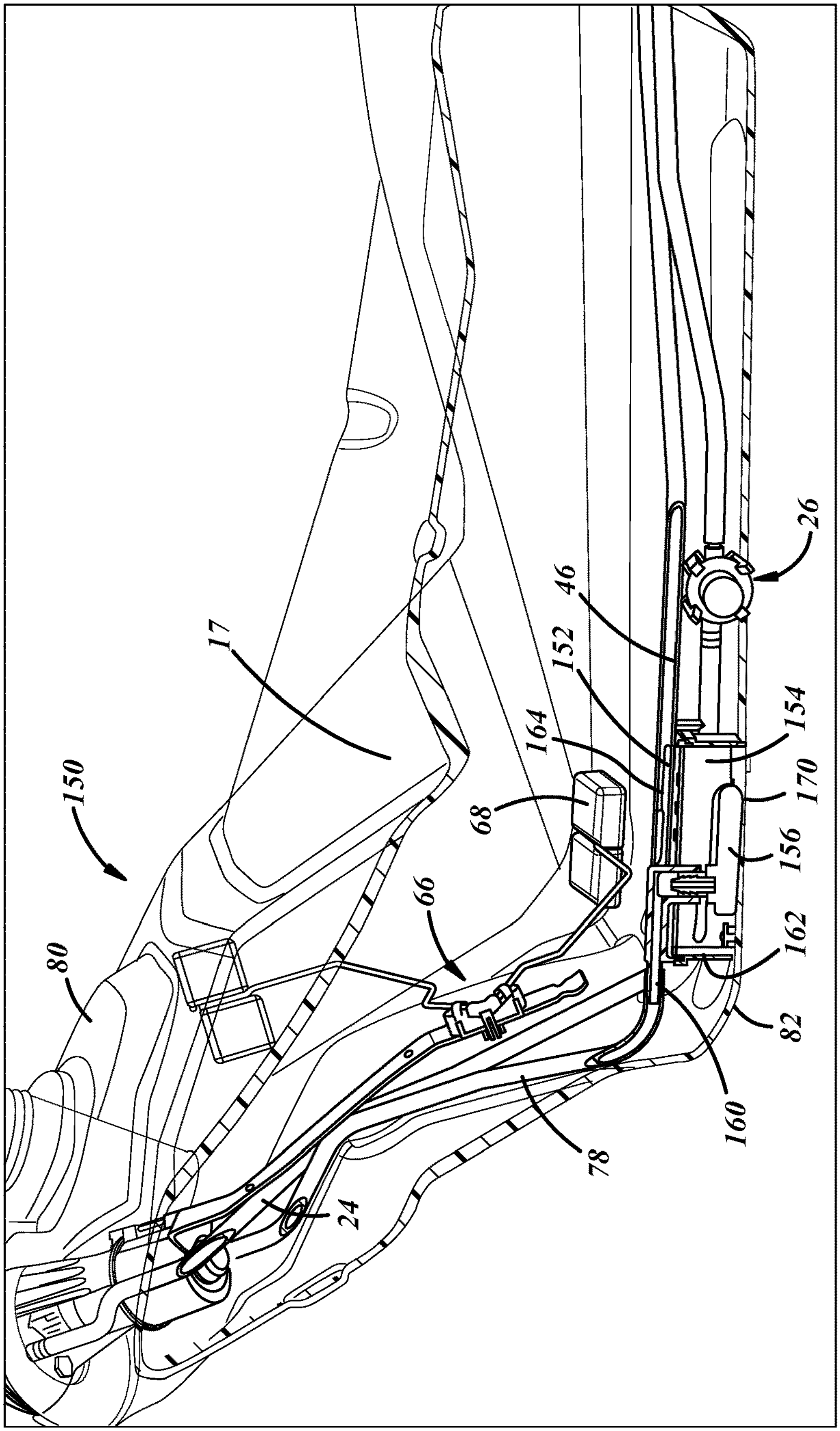
FIG. 12 is a perspective view of a portion of the assembly of FIG. 11 inside of a fuel tank.
Figure 13:
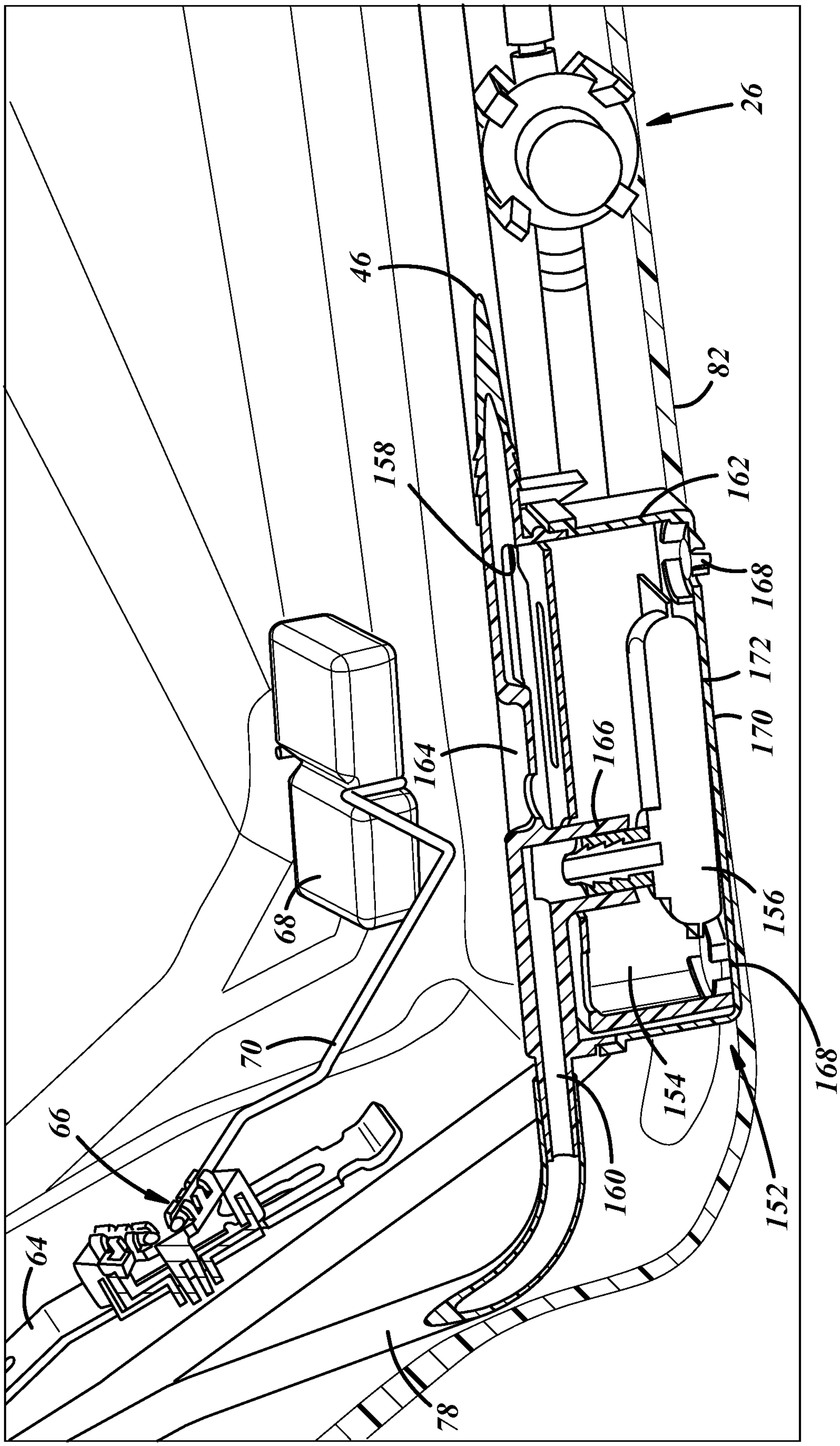
FIG. 13 is a fragmentary sectional view of the fuel supply assembly showing an interior of the reservoir.

FIGS. 11-13 illustrate another fuel supply assembly 150 that may operate in the same manner as the fuel supply assembly 10. Further, for ease of description, the same reference numerals used in describing the fuel supply assembly 10 will be used to describe the same or similar components in the fuel supply assembly 150. In at least some implementations, the fuel supply assembly 150 may be the same as the fuel supply assembly 10 other than with respect to the reservoir 152.

Instead of being oriented upright and being generally cylindrical like the reservoir 12, the reservoir 152 may be oriented with a major dimension (e.g. length) parallel to the bottom wall 82 of the fuel tank 17. The reservoir 152 may have any desired shape and is shown as being a generally rectangular cuboid. The dimensions of the cuboid may vary and, in general, are chosen to provide a desired interior volume 154 (FIG. 13) and to fit through the opening of the fuel tank 17 to which the mounting flange 72 is fitted. A baffle may be provided, if desired, or the jet pump outlet tube 46 may open directly into the reservoir internal volume 154 in which a fuel filter 156 may be received.

The reservoir first inlet 158, which receives fuel from the secondary fuel pump outlet 36 via the outlet tube 46, and the reservoir outlet 160, through which fuel flows to the primary fuel pump 14 via the inlet tube 78, may be formed in the reservoir, either in a main body 162 or in a cover 164 that is coupled to the main body 162. In the implementation shown, the reservoir inlet 158 and reservoir outlet 160 are formed in the cover 164. The cover 164 may also include a cylindrical projection 166 (FIG. 13) that defines part of or leads to the outlet 160, and to which the filter 156 may be coupled so that the interior of the projection 166 is communicated with the interior of the filter.

The elongated reservoir 152 may permit second inlets 168 that are spaced further apart to facilitate fuel entering the reservoir internal volume 154 as fuel moves in the fuel tank, especially at lower fuel levels in the fuel tank. Further, in an upright reservoir, the fuel filter might be bent to fit within the upright reservoir and the kink or bend in the filter can reduce fuel flow, and the relatively small lower wall of the reservoir means that less surface area of the fuel filter is oriented at the bottom of the reservoir and more of the filter extends axially upwardly, away from the bottom wall. To avoid these things a much smaller filter would have to be used than with the horizontally oriented reservoir 152 which facilitates receipt of the filter 156 in an unbent form and can improve the efficiency and useful life of the filter 156.

The filter 156 may overlie at least half of the surface area of the bottom wall 170 of the reservoir 152, in at least some implementations. And the filter 156 may remain flat, not folded, with a majority and up to all of a lower surface 172 of the filter 156 immediately adjacent to the inner surface of the bottom wall 170 of the reservoir 152, where immediately adjacent means within ½ inch thereof. A major or greatest dimension of the filter 156 may be perpendicular or within 20 degrees of perpendicular to the projection 166 (e.g. an axis or centerline thereof) in the installed position of the filter. The reservoir 152 has a bottom wall 170 that is designed/adapted to be received against the lower wall 82 of the fuel tank 17, and the bottom wall 170 of the reservoir is longer than the height of the reservoir, where height is the dimension extending away from the bottom wall of the reservoir.

Figure 15:
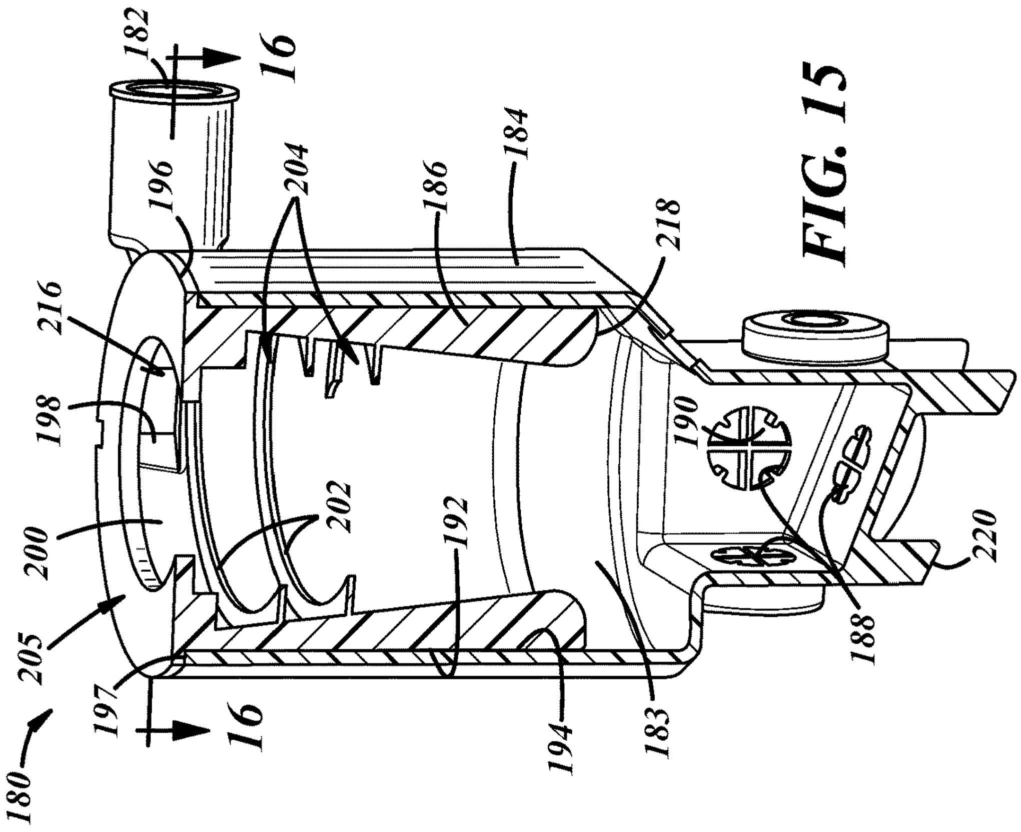
FIG. 15 is a sectional view of the reservoir of FIG. 14.
Figure 14:
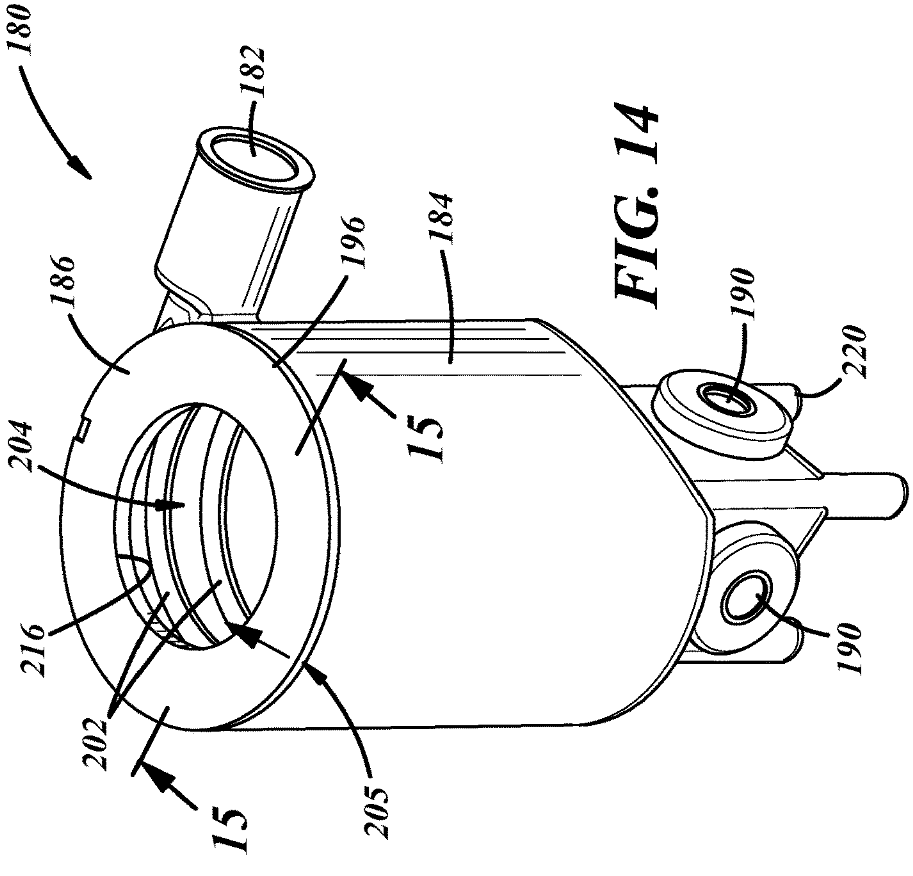
FIG. 14 is a perspective view of an alternate reservoir including flow control features.

FIGS. 14 and 15 illustrate an embodiment of a reservoir 180 having one or more inlet flow control features. The flow control features route fuel from the first inlet 182 into the interior 183 (internal volume) of the reservoir 180 in a desired manner. In the example shown in FIGS. 14 and 15, the reservoir 180 has a first body 184 and a second body 186 coupled to the first body. The first body 184 may define at least most of an exterior of the reservoir 180, the first inlet 182 (e.g. in a tubular portion defined in the first body) and one or more second inlets 188 located at a lower portion of the first body 184. A check valve 190 may be provided for each second inlet 188, as described above.

As shown in FIG. 15, the second body 186 may be received within the first body 184 with an outer surface 192 of the second body 186 against an inner surface 194 of the first body 184. The second body 186 may include a flange 196 that abuts an upper end 197 (FIG. 15) of the first body 184 in the assembled position. The second body 186 may be tubular and have an opening 198 communicated with the first inlet 182 so that fuel that enters the reservoir 180 flows through the opening 198 and onto an inner surface 200 of the second body 184. The inner surface 200 of the second body 186 may include one or more flow features, shown as inwardly extending, annular flanges 202 that are axially spaced apart and arranged to form a spiral or helical channel 204 having more than one level. The radial exterior of the channel 204 is bounded or defined by the inner surface 200 of the second body 186 and the radial interior portion of the channel 204 may be open to the interior 183 of the reservoir 180.

Fuel that flows through the opening 198 is directed along and against the inner surface 200 of the second body 186 and flows in a spiral path defined by the channel 204 from an upper level to a lower level before emptying into the remainder of the interior 183 of the reservoir 180. So the opening 198 may be oriented generally tangentially toward the inner surface 200 of the second body 186, generally parallel to a portion of the inner surface 200 immediately downstream of the opening 198. The upper flange 196 (or a separate flange) may be provided above the first inlet 182, such that at least one flange is above the first inlet 182 and at least one flange 202 is below the first inlet 182. The upper flange 196 directs fuel downwardly or otherwise inhibits fuel from flowing upwardly and exiting the reservoir 180 through the open upper end 205 of the reservoir 180.

Figure 16:
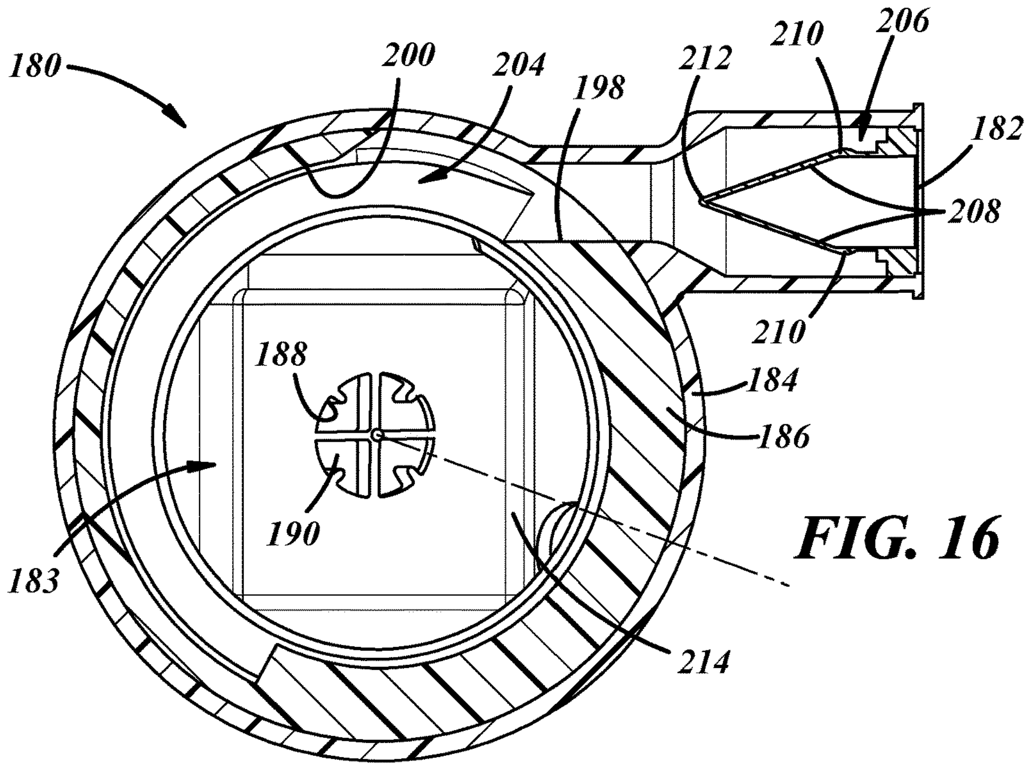
FIG. 16 is a sectional view of the reservoir taken generally along line 16-16 of FIG. 15.

As shown in FIG. 16, an inlet valve 206, such as a duckbill shaped check valve, may be provided at or in the first inlet 182 to permit fuel flow into the reservoir 180 but prevent fuel flow out of the reservoir through the first inlet. The duckbill inlet valve 206 has opposed flaps 208 that are angled from first ends 210 that are closer to the first inlet 182 and which are spaced apart from each other to free ends 212 that are engaged with each other in the closed position as shown in FIG. 16. The flaps 208 are separated from each other to permit fuel flow through a slit between the flaps 208 in the open position of the valve. The valve flaps 208 may be oriented to further direct fuel toward and generally parallel to the inner surface 200 of the portion of the second body 186 adjacent to the first inlet 182, and generally perpendicular to an axis 214 of the second body 186, so the fuel more readily flows through and follows the contours of the spiral flanges 202/channel 204 in the second body 186. The inlet valve 206 may keep fuel within the secondary pump outlet tube 46 to better maintain the secondary pump 34 primed with fuel for improved efficiency of the secondary pump.

The spiral/annular fuel flow path (e.g. channel 204) in the reservoir 180 utilizes the velocity of fuel flow to create a centrifugal force that helps separate or extract fuel vapor or air from the liquid fuel. The gasses may be vented from the reservoir 180 through an opening 216 in the second body 186 at the top of the reservoir 180, and the liquid gas may flow downward to the bottom of the reservoir interior 183. To further promote the centrifugal force and maintain a desired velocity of fuel flow through the channel 204, as shown in FIG. 15, the inner surface 200 of the second body 186 may be tapered to have a larger cross-sectional area near the upper end 205 of the reservoir 180 than near the bottom 218 of the second body 186, between the upper end 197 and lower end 220 of the first body 184. A filter may be provided within the reservoir interior 183, if desired. While shown as being formed from two initially separate bodies 184, 186 that are assembled together, the reservoir 180 could be formed from more than two bodies or a single body with the features of the second body integrally formed in the interior of the first body (perhaps with the upper flange omitted, or defined in a separate body, like a cap fitted onto the reservoir).

Figure 17:
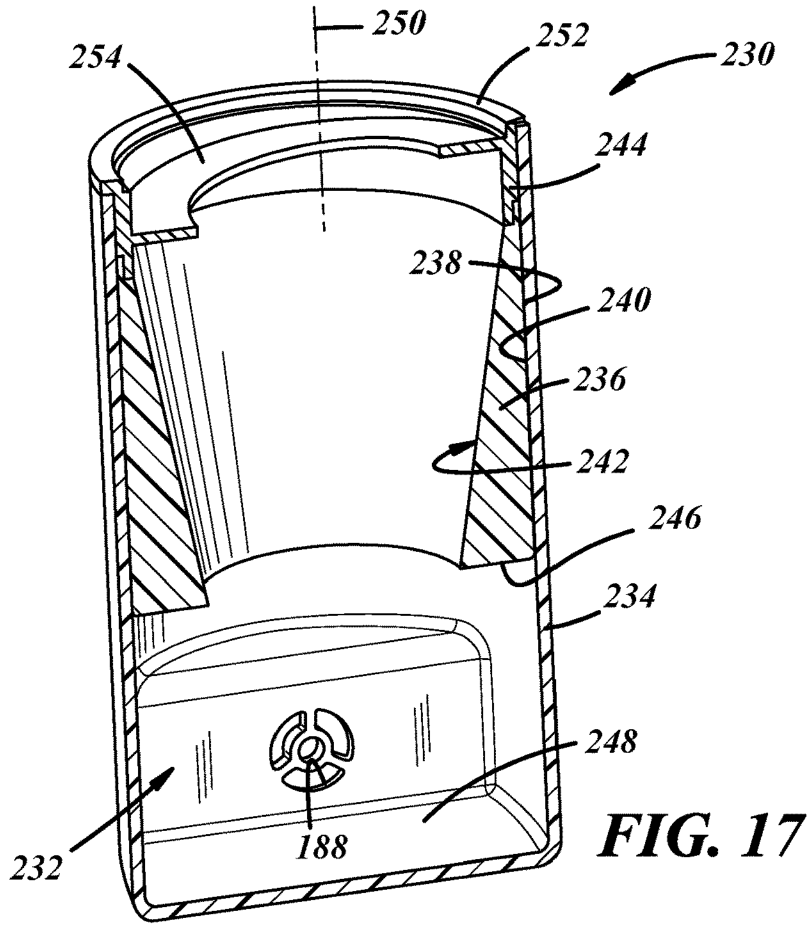
FIG. 17 is a sectional view of an alternate reservoir.

FIG. 17 illustrates another embodiment of a reservoir 230 with one or more flow features arranged to promote a desired fuel flow into the reservoir interior 232 from the first inlet (not shown, but may be constructed as shown and described with reference to the reservoir 180). This reservoir 230 may also include a first body 234 and a second body 236, where the first body 234 may be as described above with respect to reservoir 180 or otherwise constructed as desired. The second body 236 may include an outer surface 238 received adjacent to the inner surface 240 of the first body 234, and an inner surface 242 that defines part of the reservoir interior 232. The inner surface 242 is tapered so that the cross-sectional area bounded by the inner surface 242 decreases from a first end 244 of the second body 236 to a second end 246 of the second body 236 that is closer to the bottom 248 of the reservoir interior 232 than the first end 244. A check valve may be provided in the first inlet (e.g., inlet valve 206), and may be arranged to direct fuel along the inner surface 242 of the second body 236, generally perpendicular to an axis 250 of the second body 236, as described above. The inner surface 242 may be smooth and without inwardly extending flanges as described above with respect to the second body 186. The second body 236, or a cap 252 coupled to one or both of the first body and second body 234, 236, may include an inwardly extending and axially tapered or angled flange 254 to promote a spiral or annular flow path for the fuel, as described with respect to the reservoir 180. The flange 254 may have a portion that is axially above the first inlet and fuel may flow against or below the flange 254. One or more second inlets 188 may be included, and may include associated check valves, as described above.

Figure 19:
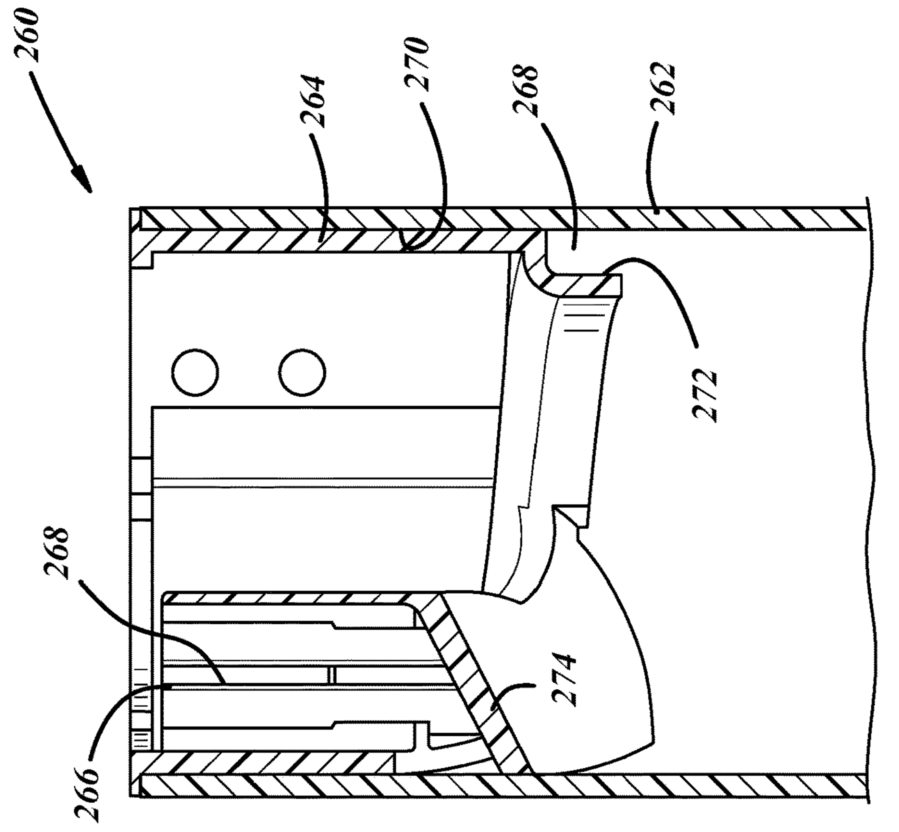
FIG. 19 is a sectional view of a portion of the reservoir of FIG. 18.
Figure 18:
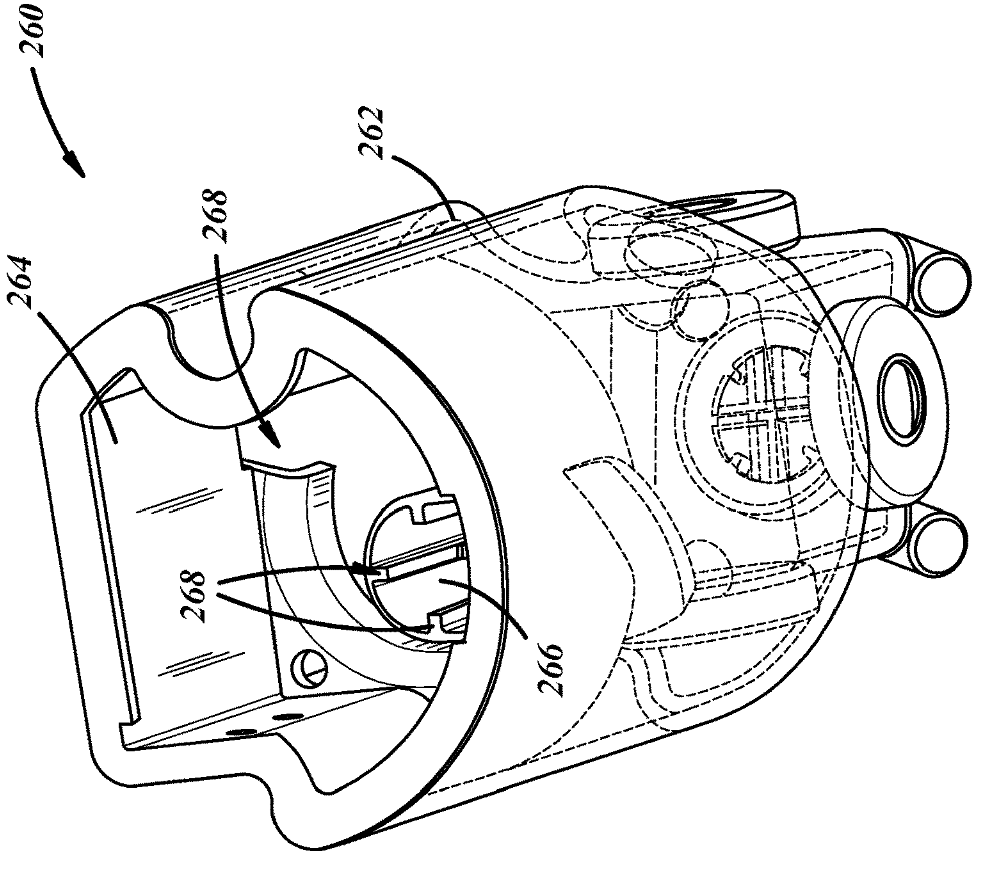
FIG. 18 is a perspective view of an alternate reservoir.

FIGS. 18 and 19 illustrate a reservoir 260 having a first body 262 which may be the same as described above with respect to reservoir 180, and at least some of the same reference numbers will be used in the drawings to describe the same or similar features that are not specifically discussed with respect to this embodiment). A second body 264 is coupled to the first body 262 and may include an inlet 266 adapted to receive fuel from the secondary pump outlet tube 46 which may be received in the inlet 266. The inlet 266 may be defined in a cylindrical passage formed in the second body 264 which may include inwardly extending tabs 268 arranged to engage and frictionally retain the outer surface of the outlet tube 46 when pressed into the inlet 266. The inlet 266 may lead to a peripheral channel 268 defined between an inner surface 270 of the first body 262 and an outer surface 272 of the second body 264. The channel 268 may be axially tapered and a portion of the channel 268 may include a lower wall 274 defined by the second body 264 an against which the fuel flows under the force of gravity. The lower wall 274 may be angled so that a radially inner side is axially higher than a radially outer side, where the radially outer side is closer to the inner surface 270 of the first body 262. The channel 268 guides fuel flow around the exterior of the second body 264, creates a centrifugal force and helps separate the gasses from liquid fuel before the liquid fuel flows out of the channel 268 and into the remainder of the reservoir interior. The second body 264 could form a spiral having any desired number of levels (e.g. rings) through which the fuel flows.

With the primary fuel pump 14 not being received within the reservoir, the reservoir can have a shape that is not constrained by having to fit the primary fuel pump in the reservoir interior. Thus, the reservoirs can have shapes that hold more fuel, have a greater surface area adjacent a bottom wall of the fuel tank to improve performance in low fuel levels, can have fuel flow control features to reduce vapor or otherwise route fuel in the reservoir in a desired manner, and other benefits may be achieved in at least some implementations. Further, the separated fuel pump and reservoir arrangements enable use of the assemblies in different fuel tanks having varying heights (dimension between upper and lower fuel tank walls), and in fuel tanks having significant height in the area in which the fuel pump is mounted. Further, the jet pump 34 being carried by a filter pickup can provide a stronger, more effective pumping action for the filter assembly 120 than if the jet pump is remotely located, for example, near the primary fuel pump 14 or reservoir. The hoses/tubing used to route fuel to and from the jet pump 34 may be rigid to maintain a desired spatial relationship between, for example, the reservoir and the jet pump. In other implementations, the hoses/tubes may be flexible and permit the filter assembly 120/jet pump 34 to move a desired amount, for example, so the assembly can follow liquid fuel movement (e.g. by gravity or acceleration forces acting on the assembly) rather than being rigidly retained in a region of the tank in which fuel might not be present at a particular time.

In at least some implementations, the secondary fuel pump is coupled to the reservoir by one or more rigid conduits that maintain the secondary fuel pump at a distance from the reservoir that does not vary by more than ten percent in use of the assembly, under acceleration forces on the secondary fuel pump and fuel in the fuel tank in use, except for forces that may act on the secondary fuel pump during a vehicle collision that may cause higher acceleration forces. In at least some implementations, under lateral (e.g. perpendicular to gravity and with reference to the static, as-installed position of the tank and secondary fuel pump) accelerations between 0 and 1.0 times gravity, the secondary fuel pump remains within 37 mm of static location. That is, under such accelerations, the secondary fuel pump moves equal to or less than 37 mm from the nominal, at rest, installed position. Under lateral accelerations between 1.0 and 3.0 times gravity, the secondary fuel pump moves equal to or less than 70 mm from its static position (i.e. nominal, at rest, installed position). In some systems, a vehicle travels straight forward and/or straight in reverse in a fore-aft direction, and the lateral direction/accelerations may be perpendicular to gravity and the fore-aft direction. Under fore/aft and vertical accelerations (e.g. with or against gravity) greater than zero and less than 4.0 times gravity, either with zero or more than zero lateral acceleration, the vertical position of the secondary fuel pump changes by 12 mm or less from the nominal, at rest, installed position.

In at least some implementations, the secondary fuel pump is coupled to the reservoir by one or more conduits that are flexible to permit the secondary fuel pump to move relative to the reservoir by six or more inches under the force of fuel and acceleration forces on the secondary fuel pump in use of the assembly, not including forces that may act on the secondary fuel pump during a vehicle collision.

In at least some implementations, under lateral (as defined by the static, installed orientation of the tank and secondary fuel pump) accelerations between 0 and 1.0 times gravity, the secondary fuel pump moves up to 12 inches from the nominal, at rest, installed position, such as between 3 inches and 12 inches. Under lateral accelerations between 1.0 and 3.0 times gravity, the secondary fuel pump moves up to 14 inches of from the nominal, at rest, installed position, such as between 6 inches and 14 inches. Under fore/aft accelerations between 0 and 1.0 times gravity, the secondary fuel pump moves up to 12 inches from the nominal, at rest, installed position, such as between 3 inches and 12 inches. Under fore/aft accelerations between 1.0 and 3.0 times gravity, the secondary fuel pump moves up to 14 inches from the nominal, at rest, installed position, such as between 6 inches and 14 inches. Under vertical accelerations greater than zero and less than 4.0 times gravity, either with zero or more than zero lateral acceleration, the secondary fuel pump moves up to 12 inches from the nominal, at rest, installed position.

In at least some implementations, the secondary fuel pump is coupled to the reservoir by one or more conduits that are rigid enough to prevent the secondary fuel pump from moving relative to the reservoir a distance greater than a largest dimension of the body of the secondary fuel pump under acceleration up to 3 times gravity. In at least some implementations, the secondary fuel pump is coupled to the reservoir by one or more conduits that are flexible enough to permit the secondary fuel pump to move relative to the reservoir a distance greater than a largest dimension of the body of the secondary fuel pump under acceleration up to 3 times gravity.

The forms of the invention herein disclosed constitute presently preferred embodiments and many other forms and embodiments are possible. It is not intended herein to mention all the possible equivalent forms or ramifications of the invention. It is understood that the terms used herein are merely descriptive, rather than limiting, and that various changes may be made without departing from the spirit or scope of the invention.

As used in this specification and claims, the terms "for example," "for instance," "e.g.," "such as," and "like," and the verbs "comprising," "having," "including," and their other verb forms, when used in conjunction with a listing of one or more components or other items, are each to be construed as open-ended, meaning that that the listing is not to be considered as excluding other, additional components or items. Other terms are to be construed using their broadest reasonable meaning unless they are used in a context that requires a different interpretation.

The invention claimed is:

1. A fuel supply assembly, comprising:

a reservoir having; an interior; an inlet that communicates with the reservoir interior; and a channel having multiple levels that define a spiral flow path that directs fuel outwardly against an inner surface of the reservoir;

a primary fuel pump having an inlet in communication with the reservoir interior and an outlet through which fuel is discharged under pressure;

a pressure regulator having an inlet that receives fuel previously discharged from the primary fuel pump outlet, an outlet through which fuel flows and a pressure regulating valve that controls fuel flow from the pressure regulator inlet to the pressure regulator outlet; and a secondary fuel pump having a body that defines a first inlet, a second inlet and an outlet, wherein the first inlet receives at least some of the fuel discharged from the pressure regulator outlet, a nozzle communicated with the first inlet so that fuel that flows out of the nozzle flows into the body via the first inlet, the second inlet is in communication with a supply of fuel, and the outlet is in communication with the reservoir interior wherein the flow of fuel through the nozzle creates a drop in pressure in the area of the second fuel inlet to draw fuel from the supply of fuel through the second fuel inlet and the fuel drawn in through the second fuel inlet is combined with the flow of fuel from the nozzle and the combined fuel flows are discharged from the secondary fuel pump outlet and into the reservoir.

2. The assembly of claim 1 which also includes a return fuel line and wherein the return fuel line is coupled to the pressure regulator inlet.

3. The assembly of claim 1 wherein the primary fuel pump is carried by a mount body, a bracket extends between the mount body and the reservoir, and the reservoir is located spaced from the mount body.

4. The assembly of claim 3 wherein the mount body includes a mounting flange adapted to be coupled to an upper wall of a fuel tank, and the reservoir includes a bottom wall adapted to engage a bottom wall of the fuel tank.

5. The assembly of claim 1 wherein the reservoir includes a baffle defining an inlet chamber into which fuel is received from the secondary pump outlet.

6. The assembly of claim 1 wherein the reservoir is constructed so that a lower wall of the reservoir is adapted to be received against a lower wall of a fuel tank, and the lower wall of the reservoir is longer than the height of the reservoir, where height is the dimension extending away from the lower wall of the reservoir.

7. The assembly of claim 1 wherein the reservoir includes a body that defines an inner surface that is tapered, wherein the inner surface has a smaller cross sectional area nearer to a bottom of the reservoir than an upper end of the reservoir.

8. The assembly of one or more of claim 1 wherein an inlet valve is provided in the inlet of the reservoir, and the inlet valve is shaped to direct fuel along an inner surface of the reservoir.

9. The assembly of claim 1 wherein the secondary pump is coupled to a filter and the filter and secondary pump are located remotely from the reservoir.

10. The assembly of claim 1 wherein the primary fuel pump is located outside of the reservoir interior.

11. The assembly of claim 10 wherein the primary pump is not carried by the reservoir.

12. The assembly of claim 9 wherein the secondary fuel pump is coupled to the reservoir by one or more rigid conduits that maintain the secondary fuel pump at a distance from the reservoir that does not vary by more than 70 mm under acceleration up to 3 times gravity.

13. The assembly of claim 9 wherein the secondary fuel pump is coupled to the reservoir by one or more conduits that are flexible to permit the secondary fuel pump to move relative to the reservoir by between 6 inches and 14 inches under acceleration up to 3 times gravity.

14. The assembly of claim 1 wherein the primary fuel pump is carried by a mount body that is adapted to be connected to a fuel tank, a conduit extends between the mount body and the reservoir, and the reservoir is located spaced from the mount body.

* * * * *